(12) United States Patent
Hashimoto

(10) Patent No.: US 6,961,069 B2
(45) Date of Patent: Nov. 1, 2005

(54) METHOD OF AND SYSTEM FOR VISUALLY SELECTING PROCESS AREA FOR EFFICIENT IMAGE PROCESSING

(75) Inventor: Masao Hashimoto, Tokyo (JP)

(73) Assignee: Ricoh Co., Ltd., Tokyo (JP)

( * ) Notice: Subject to any disclaimer, the term of this patent is extended or adjusted under 35 U.S.C. 154(b) by 237 days.

(21) Appl. No.: 10/055,410

(22) Filed: Oct. 29, 2001

(65) Prior Publication Data

US 2002/0060675 A1 May 23, 2002

(30) Foreign Application Priority Data

Nov. 16, 2000 (JP) ........................................ 2000-350238

(51) Int. Cl.⁷ .............................................. G09G 5/00
(52) U.S. Cl. ...................................... 345/629; 345/641
(58) Field of Search ........................ 345/629, 640–641, 345/790, 794–803; 382/178, 213–217, 294

(56) References Cited

U.S. PATENT DOCUMENTS

| | | | | |
|---|---|---|---|---|
| 5,348,277 A | * | 9/1994 | Crowley | 270/39.05 |
| 5,511,148 A | * | 4/1996 | Wellner | 715/530 |
| 5,687,306 A | * | 11/1997 | Blank | 345/634 |
| 5,732,230 A | * | 3/1998 | Cullen et al. | 345/764 |
| 5,880,740 A | * | 3/1999 | Halliday et al. | 345/629 |
| 5,999,662 A | * | 12/1999 | Burt et al. | 382/284 |
| 6,064,397 A | * | 5/2000 | Herregods et al. | 345/630 |
| 6,331,860 B1 | * | 12/2001 | Knox | 345/620 |
| 6,369,826 B1 | * | 4/2002 | Shimotono et al. | 345/589 |
| 6,393,162 B1 | * | 5/2002 | Higurashi | 345/629 |
| 6,407,757 B1 | * | 6/2002 | Ho | 345/776 |
| 6,466,224 B1 | * | 10/2002 | Nagata et al. | 345/592 |
| 6,470,100 B2 | * | 10/2002 | Horiuchi | 345/629 |
| 6,515,675 B1 | * | 2/2003 | Bourdev | 345/629 |
| 6,538,660 B1 | * | 3/2003 | Celi et al. | 345/592 |
| 2002/0093510 A1 | * | 7/2002 | Brunner et al. | 345/629 |

FOREIGN PATENT DOCUMENTS

JP 11-122477 4/1999

* cited by examiner

Primary Examiner—Matthew Luu
(74) Attorney, Agent, or Firm—Knobble Yoshida & Dunleavy LLC (57) ABSTRACT

A software program enables to maintain the amount of task by the operator for image processing regardless of the number of image pages. By displaying the combined overlapped image, the operator is able to visually confirm a processing area or range for a predetermined image processing. Because of the above described features, the operator is able to easily specify the tasks such as removing, moving and inserting an image in the selected area in an assured manner without significant experience or knowledge of computer programs.

48 Claims, 12 Drawing Sheets

METHOD OF AND SYSTEM FOR VISUALLY SELECTING PROCESS AREA FOR EFFICIENT IMAGE PROCESSING

FIELD OF THE INVENTION

The current invention is generally related to image processing, and more particularly related to an efficient manner of image processing multiple pages of images.

BACKGROUND OF THE INVENTION

Certain image processing devices including certain copiers and printers have a function to modify image data on the fly. For example, Japanese Patent Publication Hei 11-122477 discloses an image formation device that modifies the image data. The disclosed image formation device scans an image on an original to generate image data and removes a specified portion of the image data. Japanese Patent Publication Hei 11-122477 further discloses that a user reviews a specified portion of the scanned image data while he or she selects the width of the portion to be removed.

In the recent image processing such as copying, the image is not limited to print outs and includes image data in electronic forms. In addition to the above image data, the image processing is required to process a large amount of data in a short period of time in an efficient manner. Incidentally, the large volume image data is outputted in a plurality of pages in a hard copy or in a plurality of screen pages in an electronic copy. In the current application, the term, page is used to refer to a hard copy page as well as a screen page.

In processing the above described plurality of pages using conventional image forming devices, each page is displayed, and a portion of each page is specified for removal. For this reason, in the above described conventional image processing device or method, as the amount of image data increases, the amount of processing also increases for an operator. Thus, it remains desirable to provide a method of, a computer program of and a system for image processing a large amount of image data in a short period of time to increase the image processing efficiency.

SUMMARY OF THE INVENTION

In order to solve the above and other problems, according to a first aspect of the current invention, a method of image processing including the steps of: selecting pages of image to identify selected pages; combining the selected pages of the image into a single overlapping image; displaying the single overlapping image; selecting a portion of the single overlapping image to specify a selected portion; simultaneously image processing the selected portion of each of the pages of the image to generate image processed pages of the image; and outputting separately each of the image processed pages of the image.

According to a second aspect of the current invention, a computer readable medium storing computer instructions for image processing, the computer instructions performing the following tasks: providing a first interface for selecting pages of image to identify selected pages; combining the selected pages of the image into a single overlapping image; displaying the single overlapping image; providing a second interface for selecting a portion of the single overlapping image to specify a selected portion; simultaneously image processing the selected portion of each of the pages of the image to generate image processed pages of the image; and outputting separately each of the image processed pages of the image.

According to a third aspect of the current invention, a system for image processing including: an input unit for selecting pages of image to identify selected pages and combining the selected pages of the image into a single overlapping image; a display unit connected to the input unit for displaying the single overlapping image; a selection unit connected to the display unit for selecting a portion of the single overlapping image to specify a selected portion; an image processing unit connected to the selection unit for simultaneously image processing the selected portion of each of the pages of the image to generate image processed pages of the image, the image processing unit separately outputting each of the image processed pages of the image.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
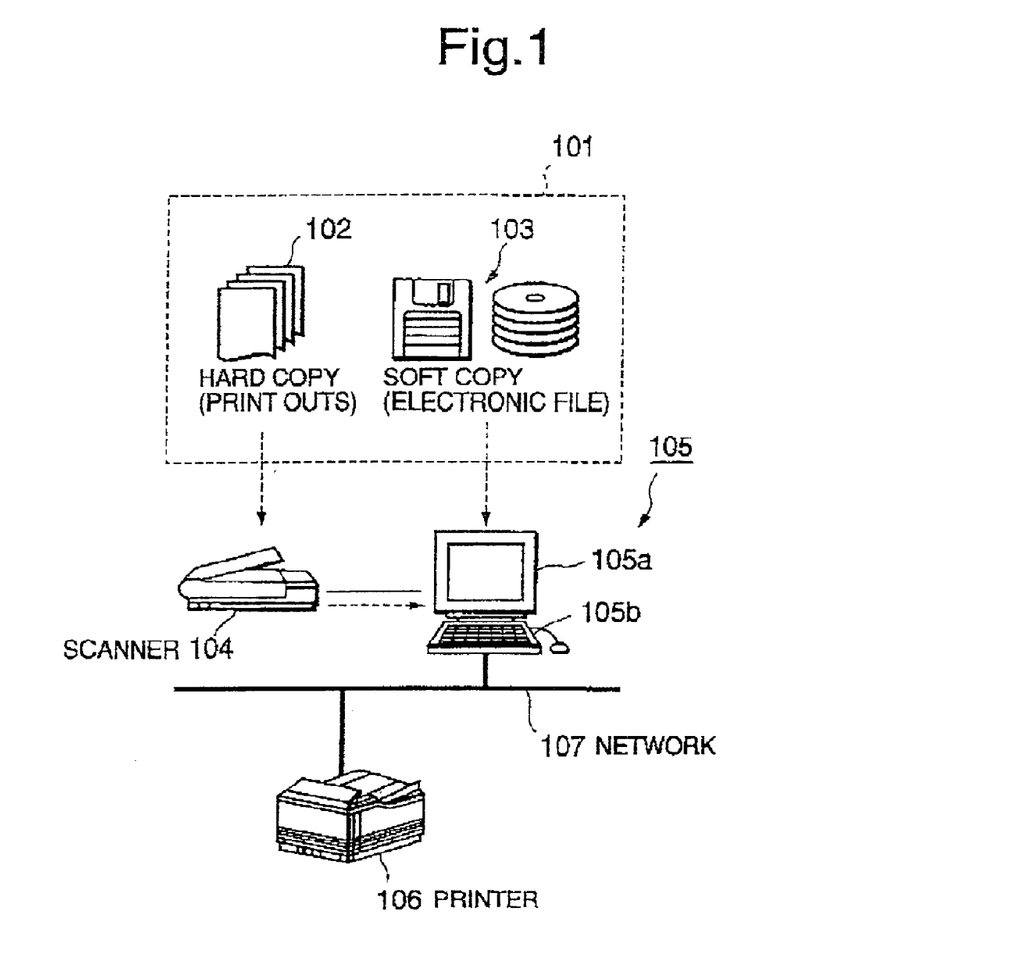
FIG. 1 is a diagram illustrating one preferred embodiment of the image processing system according to the current invention.

Referring now to the drawings, wherein like reference numerals designate corresponding structures throughout the views, and referring in particular to FIG. 1, a diagram illustrates one preferred embodiment of the image processing system according to the current invention. A scanner 104 of the preferred embodiment reads in an image or a hard copy 102 and generates image data. A personal computer (PC) 105 of the preferred embodiment receives the image data from the scanner 104 or other image data or a soft coy 103 that is stored in data storage media such as floppy disks and CDs. In the preferred embodiment, the PC 105 is connected to a printer 106 via network 107. The PC 105 further includes a display unit 105a and an input unit 105 such as a keyboard and a mouse. In the following, an original 101 is defined to include both the hard copy 102 and the soft copy 103. In the he above preferred embodiment, one to one relation between the PC 105 and the printer 106 illustrated, but it is not necessary to practice the current invention. Any combinations of the PCs 105 and the printers 106 are provided via the network 107. Furthermore, the network 107 is not necessary to practice the current invention, and the PC 105 and the printer 106 are connected via interface.

Figure 2:
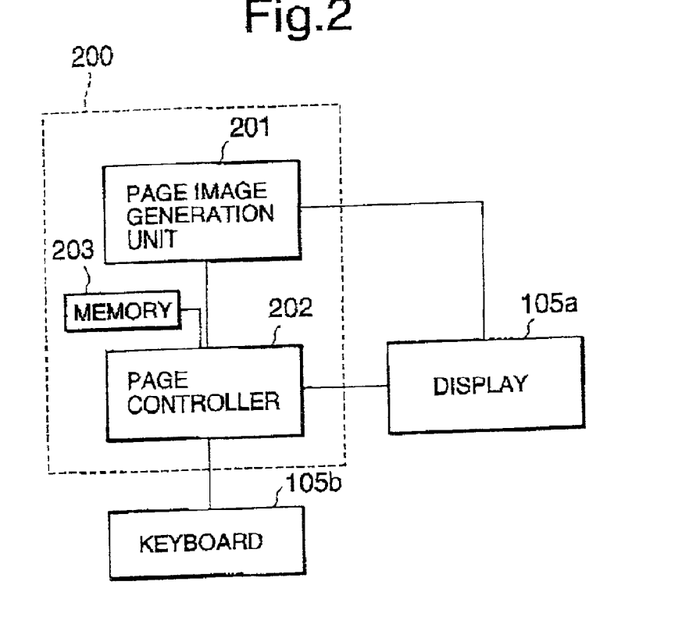
FIG. 2 is a block diagram illustrating that the PC functions to process an image and is implemented as an image processing unit according to the current invention.

Now referring to FIG. 2, the PC 105 of FIG. 1 functions to process an image and is implemented as an image processing unit 200. The image processing unit 200 generally controls the tasks that are performed to process an image and further includes a page image generation unit 201, a page controller 202 and a memory 203. The page controller 202 controls the page generation unit 201, the display unit 105a and the keyboard 105b. Among other things, the memory 203 stores a predetermined image that the user specifies as will be described later. After the image is inputted, the PC 105 generates a plurality of pages of images, and the printer 106 outputs the images on image-carrying media such as paper. Via the input device 105b, the user or operator optionally selects a page or more. The page image generation unit 201 combines the data corresponding to the selected page or pages to generate a combined image. The display 105a displays the combined image. The page controller 202 indicates a processing range for the multiple images that is displayed on the display unit 105a. The page controller 202 also adjusts the displayed process range as necessary and uniformly processes each image in the multiple images based upon the displayed process range. Finally, the printer 106 outputs the processed images onto paper.

Figure 3:
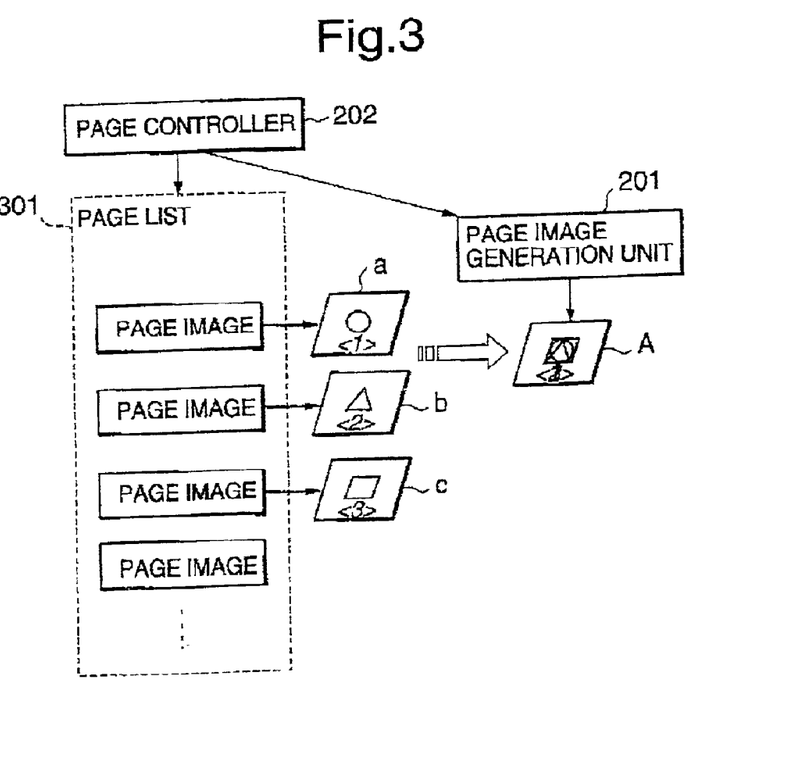
FIG. 3 is a diagram illustrating the process of combining the image data to generate the single combined multiple image as performed by the preferred embodiment according to the current invention.

Now referring to FIG. 3, a diagram illustrates the process of combining the image data to generate the single combined multiple image as performed by the preferred embodiment according to the current invention. The page controller 202 stores a portion of the inputted original image data for each corresponding output image page in a page list 301. When the operator specifies the images a, b and c, a software program called View in the image processing unit 200 requests the above specified images to be combined. In response to the above request, the page controller 202 outputs only the specified image data or pages to the page image generation unit 201. The page image generation unit 201 combines the image pages a through c to generate a single combined image A by ORing the image pages a through c. As a result, as indicated by a thick arrow, the three pages a through c are combined into the image A, and the combined image A is sent to the display 105a for display.

Figure 4A:
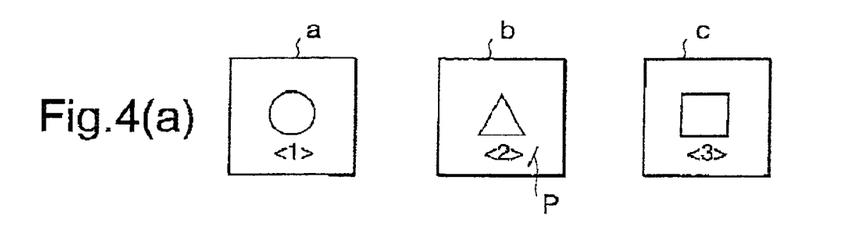
FIGS. 4(a) and 4(b) illustrate that images contain a shape and text.
Figure 4B:
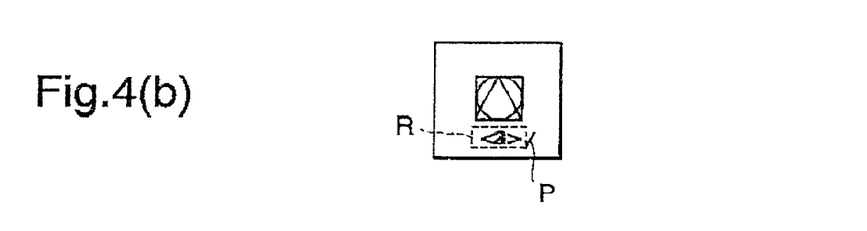

Now referring to FIG. 4, diagrams illustrate an exemplary process of removal image as performed by the preferred embodiment according to the current invention. In particular, FIG. 4(a) illustrates that an image "a" contains a circle and text, "<1>". Similarly, FIG. 4(b) illustrates an image "b" contains a triangle, a pattern P and text, "<2>" while an image "c" contains a rectangle and text, "<3>." It is assumed that the circle, the triangle and the rectangle as well as the corresponding page text are located at substantially the same locations in the images a, b and c. To further illustrate the unified process, it is also assumed that the page text is to be removed in each image page. For example, the page removal process is often used to renumber the pages. FIG. 4(b) illustrates the combined ORed image A from the images a through c. The combined image A illustrates the overlapped image of the circle, the triangle and the rectangle as well as the overlapped image of the page text, "<1>", "<222 " and "<3>". FIG. 4(b) also illustrates a rectangle R by the dotted lines to indicate an area or range for the removal process. The specified range will be further described with respect to FIG. 5.

Figure 4C:
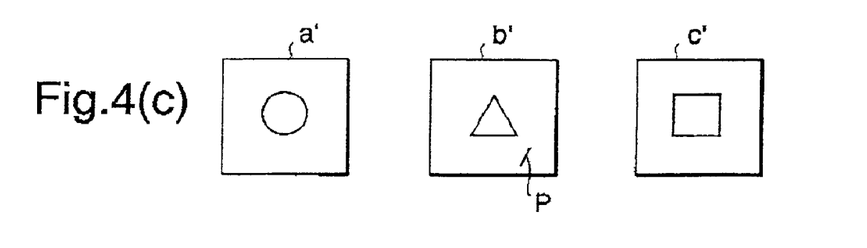
FIG. 4(c) illustrates that the text portion in each image data of FIGS. 4(a) and 4(b) is removed.

As a result of the removal process, FIG. 4(c) illustrates that the text portion in each image data is removed. The image "a" has become the image "a'," which no longer contains the text, "<1>". Similarly, the image "b" has become the image "b'," which no longer contains the text, "<2>" while the image "c" has become the image "c'," which no longer contains the text, "<3>." As described above, a plurality of the image pages is processed by specifying a single processing area or range in the displayed image. For example, even the pattern P exists only in the image b, since the position and the shape of the pattern P are visually confirmed in the combined image A, the processing area R is accurately confirmed in the combined image A. In this regard, the processing area R is accurately confirmed to remove only the page numbers without including the adjacently located pattern P. In addition to removing the page numbers, the removal process is used to remove images of punch holes or staple holes after digitizing the original image. Similarly, the headers and footers are also equally well removed by the removal process. The above first preferred embodiment of the image processing device according to the current invention enables to maintain the amount of the specifying task by the operator regardless of the number of image pages. Furthermore, by displaying the combined overlapped image, the operator is able to visually confirm the processing area or range. Because of the above described feature, the operator is able to easily specify the removal range in an assured manner without significant experience or knowledge of computer programs.

Figures 5A, 5B:
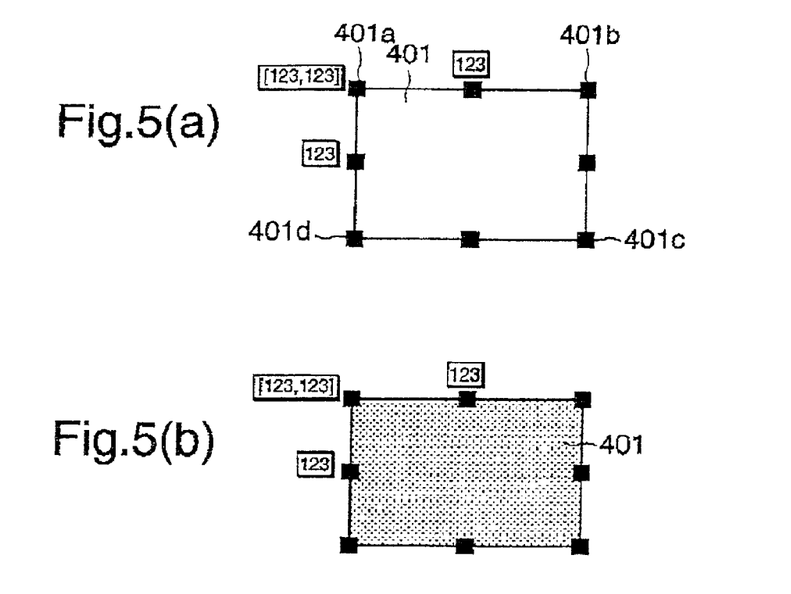
FIG. 5(a) illustrates that the process range is specified by four points or corners.
FIG. 5(b) indicates that the selected process area is shaded or in a different color or from the background.

Now referring to FIGS. 5, diagrams illustrate an exemplary range of the combined image A to be used by the preferred embodiment according to the current invention. In the combined image A as shown in the display unit 105a, a user specifies a process range 401. In particular, referring to FIG. 5(a), the process range 401 is specified by four points or corners including 401a, 401b, 401c and 401d. After an initial range is specified, the user optionally modifies the process range 401 by dragging a middle point of each line of the rectangle 401 as indicated by a solid square with a pointing device such as a mouse. In the first embodiment, the coordinates of the middle points and the corners are displayed to facilitate the user to modify the process range. FIG. 5(b) indicates that the selected process area 401 is shaded or in a different color or from the background. In the first preferred embodiment, the images in the selected area 401 are still visible in the combined image A. For example, after confirming the selected process area 401 for removal, the page controller 202 removes the images in the selected process area 401 and outputs to the printer 106 the page image without the portion that corresponds to the process area 401. The printer 106 outputs a plurality of page image without the removed portions as specified by the process area 401. The page controller 202 destroys the processed overlapped image A in response to a cancellation command from the above View program.

Figure 6:
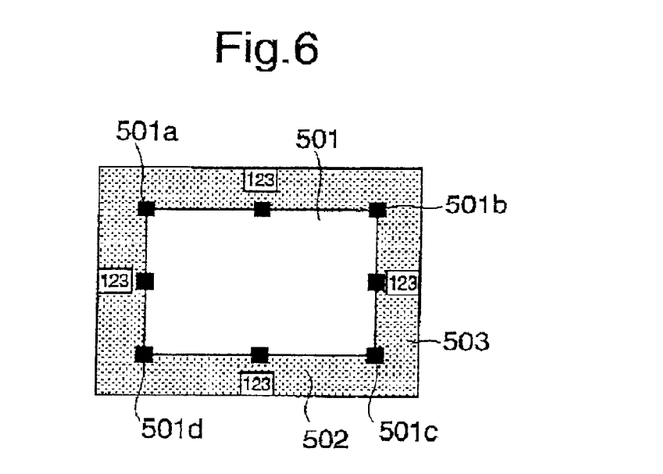
FIG. 6 is a diagram illustrating another exemplary range of the combined image A to be used by the preferred embodiment according to the current invention.

Now referring to FIG. 6, a diagram illustrates another exemplary range of the combined image A to be used by the preferred embodiment according to the current invention. In this example, a process area 502 is between outside a selected rectangle 501 and inside the overlapped image A 503 as indicated by the shaded area. The rectangle area 501 is selectable while the overlapped image A frame is fixed. The rectangle 501 is specified by fourpoints or corners including 501a, 501b, 501c and 501d. After an initial rectangle is specified, the user optionally modifies the rectangle 501 by dragging a middle point of each line of the rectangle 501 as indicated by a solid square with a pointing device such as a mouse. In the first embodiment, the coordinates of the middle points and the corners are displayed to facilitate the user to modify the process range. However, the outside frame 503 is not modifiable. For example, after confirming the selected process area 502 for removal, the page controller 202 removes the images in the selected process area 502 and outputs to the printer 106 the page image without the portion that corresponds to the process area 502. Subsequently, the page controller 202 destroys the processed overlapped image A via the page image generation unit 201. As described above, the removal process in the selected process area 502 is desirable for removing images around the edges of the original image and is facilitated by specifying the area 502 in an easy manner.

Figure 7:
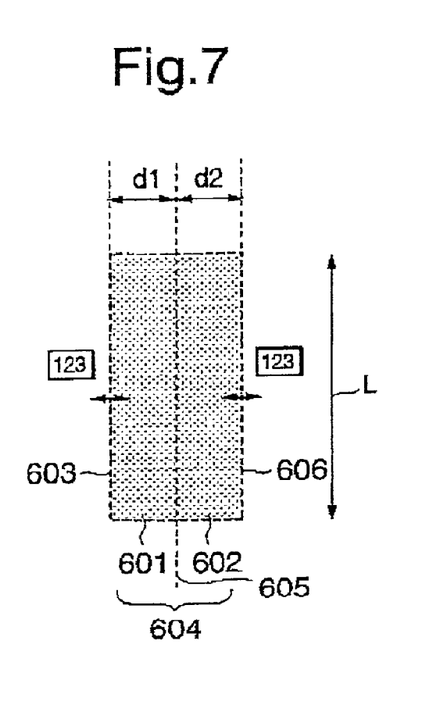
FIG. 7 is a diagram illustrating yet another exemplary range of the combined image A to be used by the preferred embodiment according to the current invention.

Now referring to FIG. 7, a diagram illustrates yet another exemplary range of the combined image A to be used by the preferred embodiment according to the current invention. A selected area 604 is defined by a central line 605 that runs the center of the combined image, a left width d1 that defines a left selected area 601 and a right width d2 that defines the right selected area 602. The selected area 604 is displayed in a color that is different from the background or shaded. Along a vertical direction L, the left selected area 601 is also bound by a line 603 while the right selected area 602 is also bound by a line 606. The central line 605 as indicated in the dotted line equally divides the selected area 604 in the combined image in the vertical direction L. Although the widths d1 and d2 are equal in the example, they are not required. After an initial area is specified, the user optionally modifies the area 604 by dragging either of the side lines 603 or 606 with a pointing device such as a mouse. As the side line 603 is dragged, the width d1 is modified in the left area 601. Similarly, as the side line 606 is dragged, the width d2 is modified in the right area 602. In the first embodiment, the coordinates of the side lines are displayed to facilitate the user to modify the process range. When the central line 605 is dragged by the pointing device on the display screen, the entire selected area 604 is moved with respect to the combined image A. For example, after confirming the selected process area 604 for removal, the page controller 202 removes the images in the selected process area 604 and outputs to the printer 106 the page image without the portion that corresponds to the process area 604. Subsequently, the page controller 202 destroys the processed overlapped image A via the pate image generation unit 201. As described above, the removal process in the selected process area 604 is desirable for removing shadows along a page boundary when a bound book is copied and is facilitated by specifying the area 604 in an easy manner.

Figure 8:
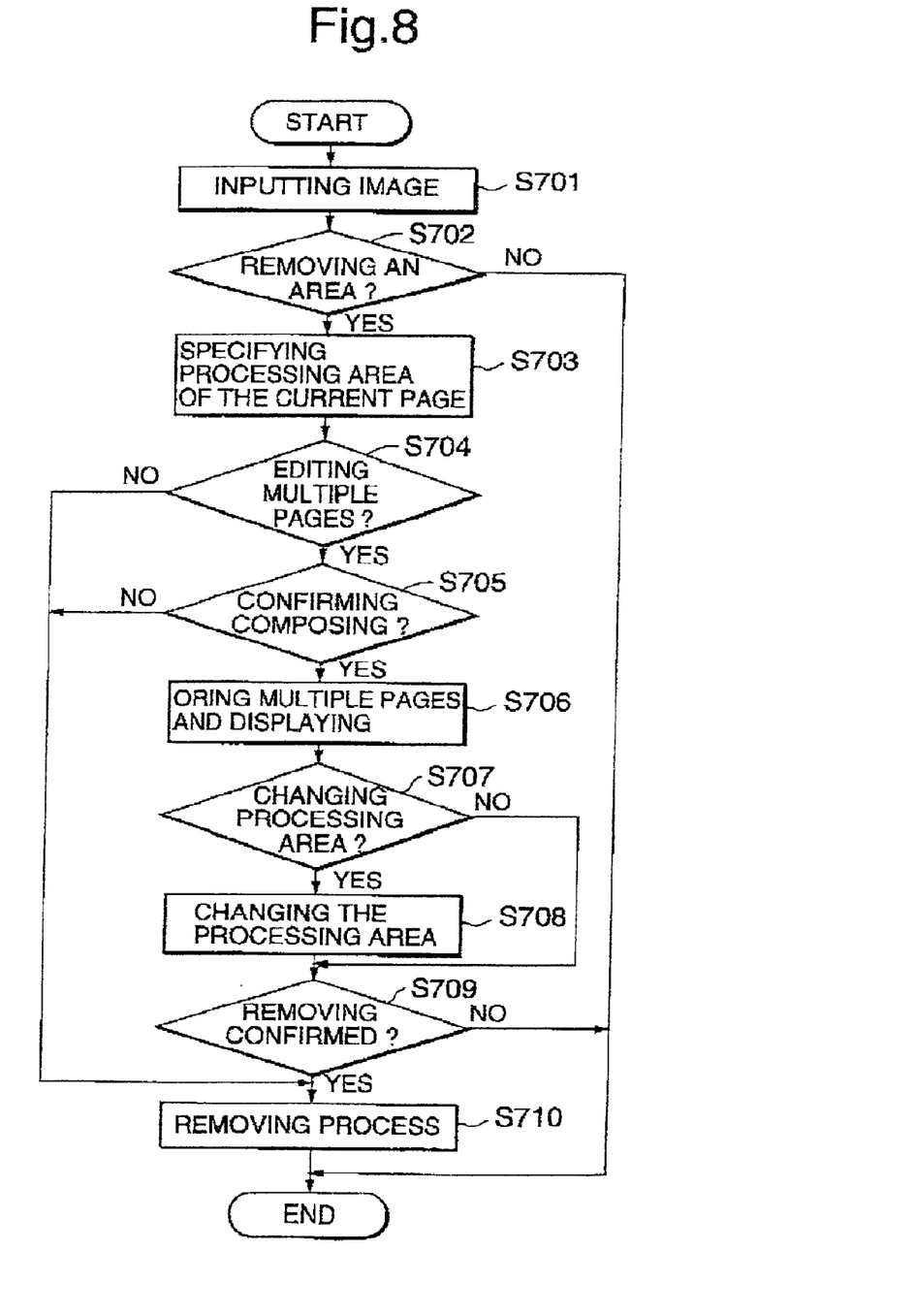
FIG. 8 is a flow chart illustrating steps involved in a preferred process of removing the selected area according to the current invention.

Now referring to FIG. 8, a flow chart illustrates steps involved in a preferred process of removing the selected area according to the current invention. Certain steps are described with respect to the above described components. In a step S701, the preferred process initiates the task, and the image data is inputted for the original image 101. In a step S702, it is determined whether or not a process is to be performed is removal. If it is determined that the process is not removing a portion of the image in the step S702, the preferred process terminates. On the other hand, if it is determined that the process is removing a portion of the image in the step S702, the preferred process proceeds to a step S703, where a portion of the image is selected for removal. In the first preferred process, the selected portion is initially predetermined, and the combined image A with the initially selected portion is displayed for modification as necessary by the user. The page controller 202 determines whether or not the original image is edited in multiple pages in a step S704. If it is determined that multiple pages are not edited in the step S704, the preferred process proceeds to a step S710. On the other hand, if it is determined that multiple pages are edited in the step S704, the preferred process proceeds to a step S705, where the multiple images are displayed and it is further determined whether or not the combined image is confirmed. If the confirmation steps are not performed, the preferred process proceeds to the step S710. On the other hand, if the confirmation steps are performed, the preferred process proceeds to a step S706, where the multiple pages of the image are ORed, and the combined image is displayed with the selected area on the display unit 105a. In a step S707, a user is given an option to modify the currently specified process area. If the user decides to modify the current process area, the preferred process provides the user with an opportunity to modify the size and or the position of the current selected process area in a step S708 and further proceeds to a step S709. If the user decides not to modify the current process area, the preferred process bypasses the step S708 and proceeds to the step S709. In the step S709, the user confirms whether or not the currently selected area is used to remove certain image from the combined image A. If the user fails to confirm the removal in the step S709, the preferred process terminates. Finally, if the user confirms the removal in the step S709, the preferred process performs the removal of the selected area in the step S710.

Figure 9:
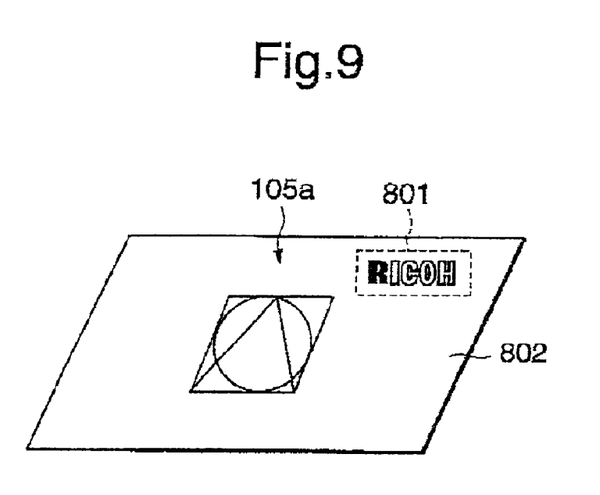
FIG. 9 is a diagram illustrating an exemplary image insertion as performed by a second preferred process according to the current invention.

Now referring to FIG. 9, a diagram illustrates an exemplary image insertion as performed by a second preferred process according to the current invention. The second preferred process is implemented on an image processing device such as the PC 105 that is substantially identical to the first preferred embodiment. The second preferred process will be described in general with respect to the above described components of FIGS. 1 and 2. In the second preferred process, the page controller 202 inserts an image or character text in the selected process area. A combined image 802 with a selected process portion 801 is displayed on the monitor 105a. In the selected process area 801, a predetermined mark or company name such as "RICOH" has been inserted. Other examples of the image to be inserted include text marks such as "CONFIDENTIAL" and "NO DUPLICATION." The inserted image is previously stored in the memory unit 203 and is read is as necessary by the second preferred process. The selected process area 801 is modified by dragging its position and changing its size on the screen monitor unit 105a with the use of a pointing device. The user visually confirms the relative position of the selected process area 801 with respect to the other image positions in the combined image 802. The selected process area 801 is optionally selected to overlap the existing image area. Based upon the coordinate data of the selected process area 801, the insertion image data and the existing image page data, the page controller 202 generates the processed image data and outputs the processed image data to the printer 106. The printer 106 prints on paper the processed combined image with the image inserted in the selected process area 801.

Figure 10:
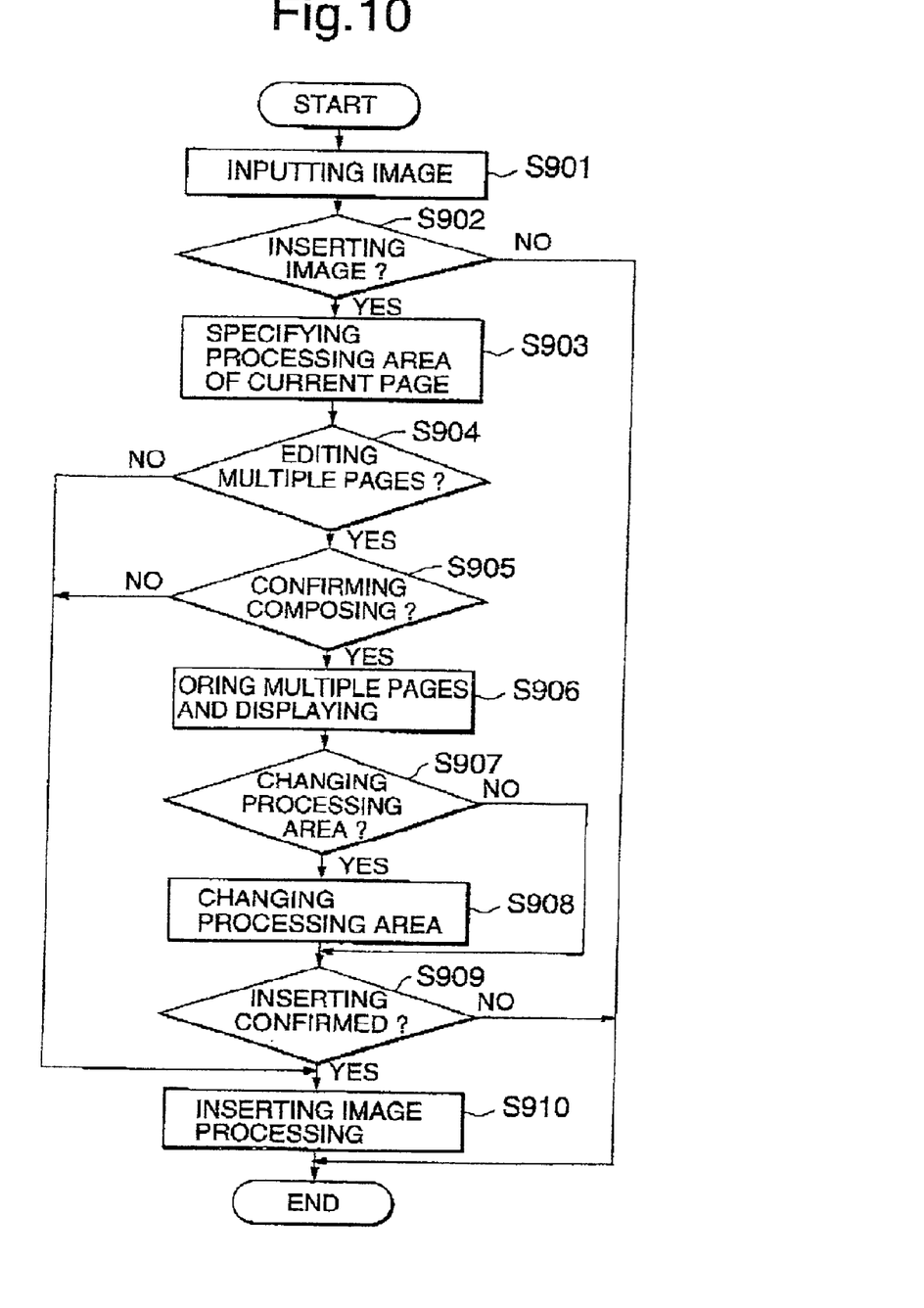
FIG. 10 is a flow chart illustrating steps involved in the second preferred process of inserting a predetermined image in the selected area according to the current invention.

Now referring to FIG. 10, a flow chart illustrates steps involved in the second preferred process of inserting a predetermined image in the selected area according to the current invention. Certain steps are described with respect to the above described components. In a step S901, the second preferred process initiates the task, and the image data is inputted for the original image 101. In a step S902, it is determined whether or not a process is to be performed is insertion. If it is determined that the process is not inserting an image in the step S902, the second preferred process terminates. On the other hand, if it is determined that the process is inserting the image in the step S902, the second preferred process proceeds to a step S903, where a portion of the image is selected for the insertion. In the second preferred process, the selected portion is initially predetermined, and the combined image A with the initially selected portion is displayed for modification as necessary by the user. The page controller 202 determines whether or not the original image is edited in multiple pages in a step S904. If it is determined that multiple pages are not edited in the step S904, the second preferred process proceeds to a step S910. On the other hand, if it is determined that multiple pages are edited in the step S904, the second preferred process proceeds to a step S905, where the multiple images are displayed and it is further determined whether or not the combined image is confirmed. If the confirmation steps are not performed, the second preferred process proceeds to the step S910. On the other hand, if the confirmation steps are performed, the second preferred process proceeds to a step S906, where the multiple pages of the image are ORed, and the combined image is displayed with the selected area on the display unit 105a. In a step S907, a user is given an option to modify the currently specified process area. If the user decides to modify the current process area, the second preferred process provides the user with an opportunity to modify the size and or the position of the current selected process area in a step S908 and further proceeds to a step S909. If the user decides not to modify the current process area, the second preferred process bypasses the step S908 and proceeds to the step S909. In the step S909, the user confirms whether or not the currently selected area is used to insert the image in the combined image A. If the user fails to confirm the insertion in the step S909, the second preferred process terminates. Finally, if the user confirms the insertion in the step S909, the second preferred process performs the insertion of the image in the selected area in the step S910. The above second preferred process of the image processing according to the current invention enables to maintain the amount of the specifying task by the operator regardless of the number of image pages. Furthermore, by displaying the combined overlapped image, the operator is able to visually confirm the processing area or range. Because of the above described features, the operator is able to easily specify the insertion area in an assured manner without significant experience or knowledge of computer programs.

Figure 11:
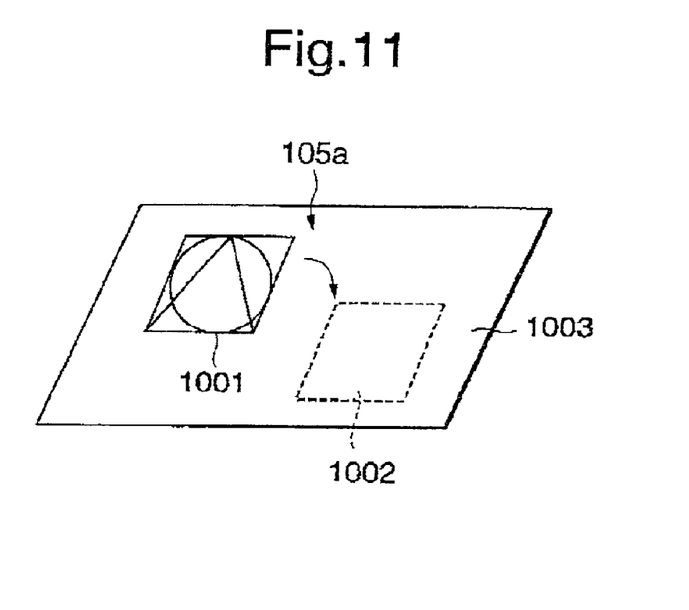
FIG. 11 is a diagram illustrating an exemplary image move as performed by a third preferred process according to the current invention.

Now referring to FIG. 11, a diagram illustrates an exemplary image move as performed by a third preferred process according to the current invention. The third preferred process is implemented on an image processing device such as the PC 105 that is substantially identical to the first and second preferred embodiments. The third preferred process will be described in general with respect to the above described components of FIGS. 1 and 2. In the third preferred process, the page controller 202 moves an image or character text in the selected process area. A combined image 1003 with a selected process portion 1001 is displayed on the monitor 105a. The selected process area 1001 contains images, and the selected process area 1001 is moved to a new location. For example, the images in the selected process area 1001 are moved to a new location 1002 as indicated in dotted lines. The selected process area 1001 is modified by dragging its position and changing its size on the screen monitor unit 105a with the use of a pointing device. The user visually confirms the relative position of the selected process area 1001 with respect to the other image positions in the combined image 1003. The selected process area 1001 is optionally selected to overlap the existing image area. Based upon the coordinate data of the selected process area 1001, the image data and the existing combined image page data, the page controller 202 generates the processed image data and outputs the processed image data to the printer 106. The printer 106 prints on paper the processed combined image with the selected image at the new location 1002 of the selected process area 1001.

Figure 12:
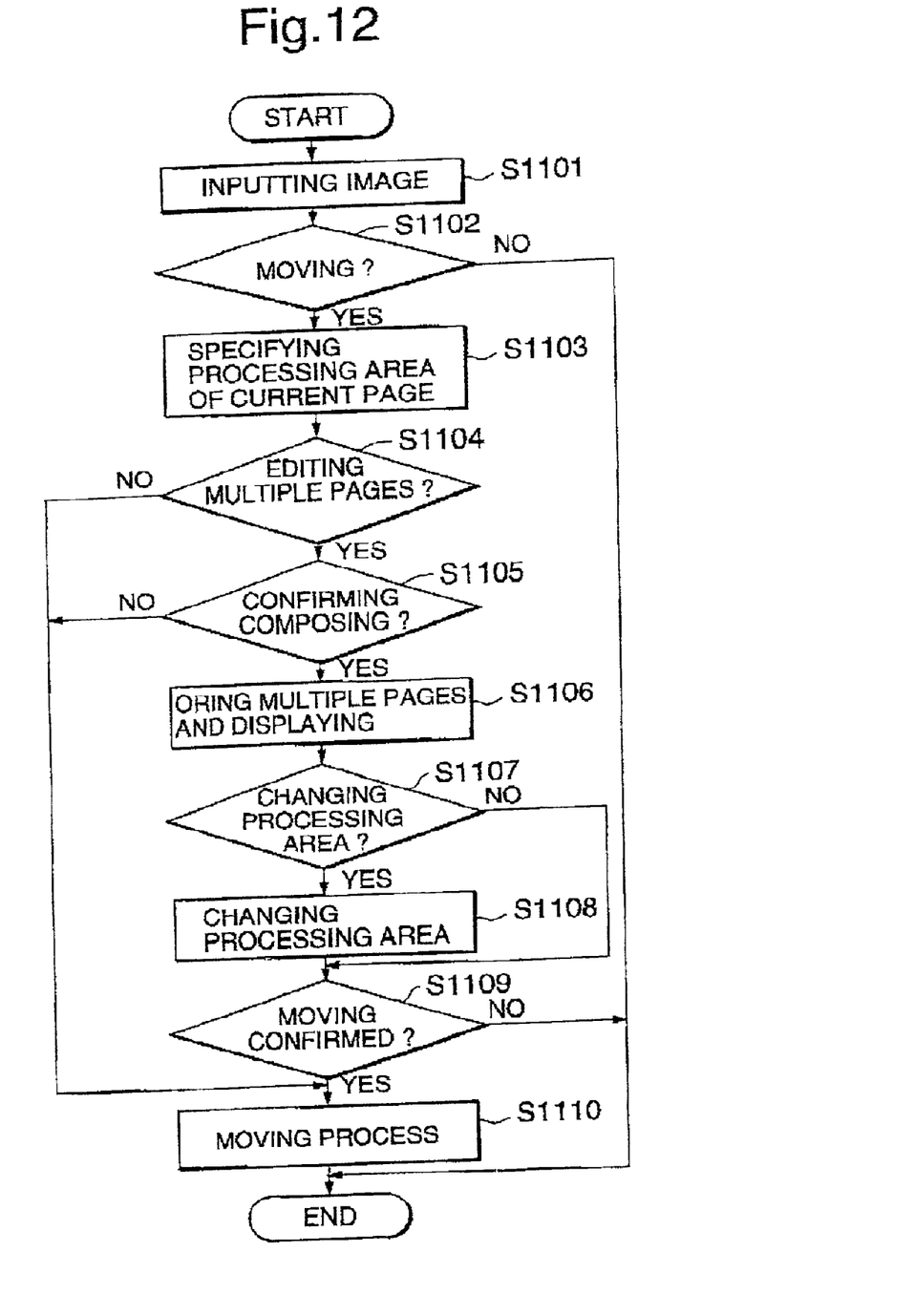
FIG. 12 is a flow chart illustrating steps involved in the third preferred process of moving an image in the selected area according to the current invention.

Now referring to FIG. 12, a flow chart illustrates steps involved in the third preferred process of moving an image in the selected area according to the current invention. Certain steps are described with respect to the above described components. In a step S1101, the third preferred process initiates the task, and the image data is inputted for the original image 101. In a step S1102, it is determined whether or not a process is to be performed is move. If it is determined that the process is not moving an image in the step S1102, the third preferred process terminates. On the other hand, if it is determined that the process is moving the image in the step S1102, the third preferred process proceeds to a step S1103, where a portion of the image is selected for the move. In the third preferred process, the selected portion is initially predetermined, and the combined image A with the initially selected portion is displayed for modification as necessary by the user. The page controller 202 determines whether or not the original image is edited in multiple pages in a step S1104. If it is determined that multiple pages are not edited in the step S1104, the third preferred process proceeds to a step S1110. On the other hand, if it is determined that multiple pages are edited in the step S1104, the third preferred process proceeds to a step S1105, where the multiple images are displayed and it is further determined whether or not the combined image is confirmed. If the confirmation steps are not performed, the third preferred process proceeds to the step S1110. On the other hand, if the confirmation steps are performed, the third preferred process proceeds to a step S1106, where the multiple pages of the image are ORed, and the combined image is displayed with the selected area on the display unit 105a. In a step S1107, a user is given an option to modify the currently specified process area. If the user decides to modify the current process area, the third preferred process provides the user with an opportunity to modify the size and or the position of the current selected process area in a step S1108 and further proceeds to a step S1109. If the user decides not to modify the current process area, the third preferred process bypasses the step S1108 and proceeds to the step S1109. In the step S1109, the user confirms whether or not the currently selected area is used to insert the image in the combined image A. If the user fails to confirm the insertion in the step S1109, the third preferred process terminates. Finally, if the user confirms the move in the step S1109, the third preferred process performs the move of the image in the selected area in the step S1110. The above third preferred process of the image processing according to the current invention enables to maintain the amount of the specifying task by the operator regardless of the number of image pages. Furthermore, by displaying the combined overlapped image, the operator is able to visually confirm the processing area or range. Because of the above described features, the operator is able to easily specify the insertion area in an assured manner without significant experience or knowledge of computer programs.

Figure 13A:
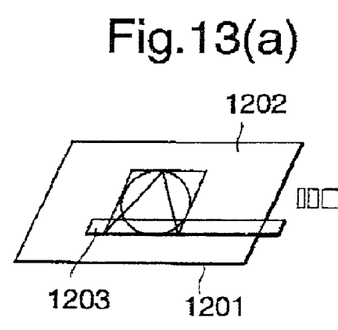
FIG. 13(a) is a diagram illustrating that the display unit displays a combined image in a first predetermined paper size.
Figure 13B:
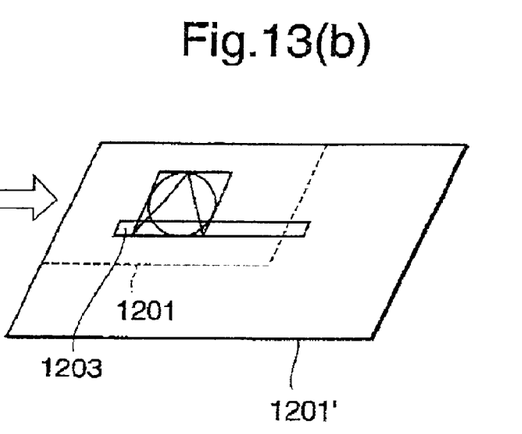
FIG. 13(b) is a diagram illustrating that the entire image of the combined image is now on paper without changing resolution.

Now referring to FIG. 13, diagrams illustrate an exemplary paper size change as performed by a fourth preferred process according to the current invention. The fourth preferred process is implemented on an image processing device such as the PC 105 that is substantially identical to the first, second and third preferred embodiments. The fourth preferred process will be described in general with respect to the above described components of FIGS. 1 and 2. Referring particularly to FIG. 13(a), the display unit 105a displays a combined image 1202 in a first predetermined paper size 1201. A part 1203 of the combined image 1202 extends the first predetermined paper size 1201. Referring particularly to FIG. 13(b), a user drags one edge of the first paper size 1201 to extend its size to a second paper size 1201' upon detecting the hidden image portion 1203 as indicated by an arrow. As the expansion takes place, the user is able to visually confirm a proper size of the paper. As a result of the expanded size 1201', the entire image of the combined image 1202 is now on paper without changing resolution. The page controller 202 generates the processed image data and outputs the processed image data to the printer 106. The printer 106 prints on paper of the second size. The paper size is previously stored in the memory unit 203 and is read is as necessary by the fourth preferred process. The paper size as specified by the length and width is inputted by the user. Alternatively, predetermined paper sizes are previously stored, and other paper sizes are added.

Figure 14:
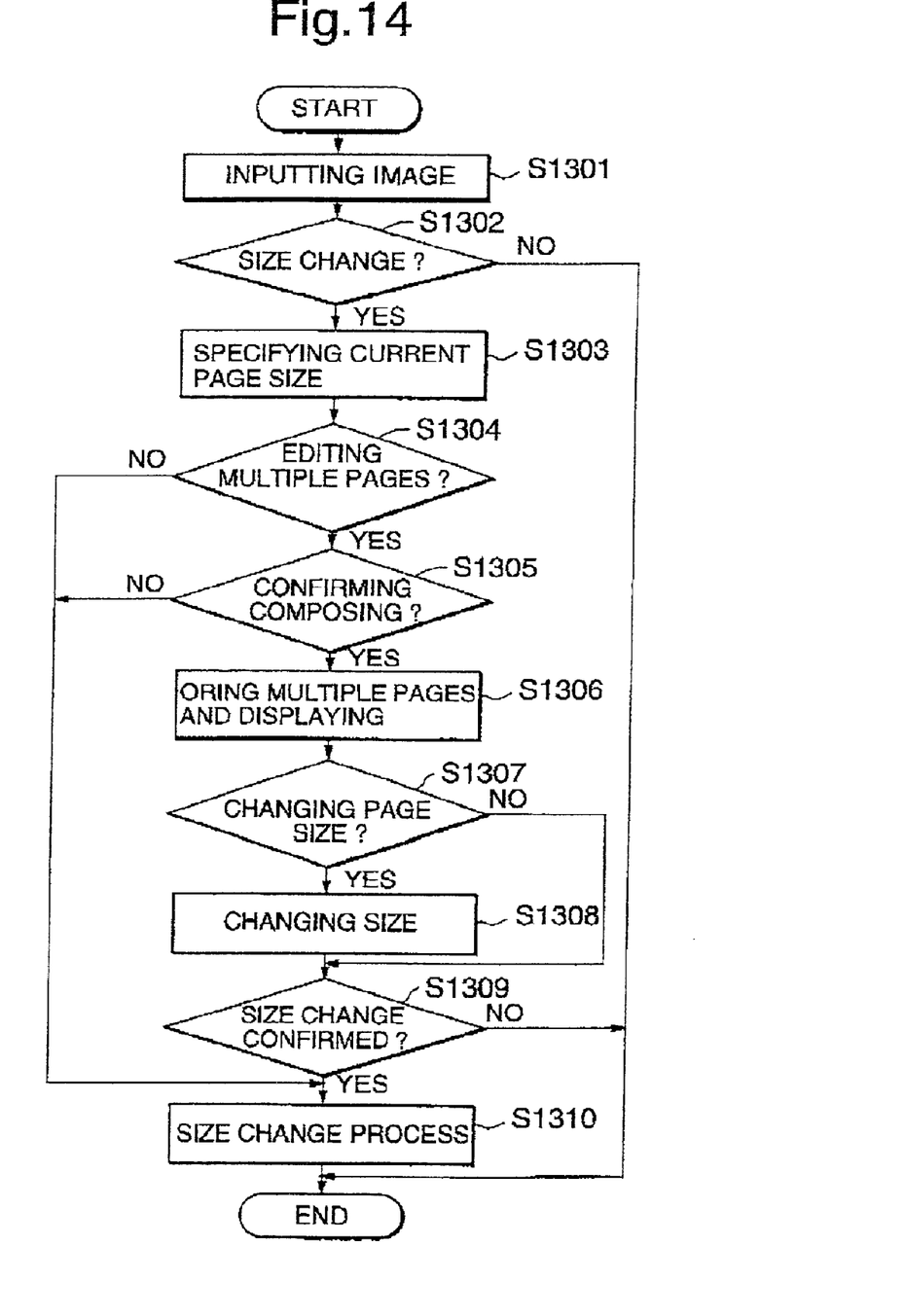
FIG. 14 is a flow chart illustrating steps involved in the fourth preferred process of changing a paper size for an image according to the current invention.

Now referring to FIG. 14, a flow chart illustrates steps involved in the fourth preferred process of changing a paper size for an image according to the current invention. Certain steps are described with respect to the above described components. In a step S1301, the fourth preferred process initiates the task, and the image data is inputted for the original image 101. In a step S1302, it is determined whether or not a process is to be performed is resizing. If it is determined that the process is not changing a paper size in the step S1302, the fourth preferred process terminates. On the other hand, if it is determined that the process is changing the size in the step S1302, the fourth preferred process proceeds to a step S1303, where a paper is selected for the combined image 1202. In the fourth preferred process, the paper size is initially predetermined, and the combined image is displayed in the paper size for modification as necessary by the user. The page controller 202 determines whether or not the original image is edited in multiple pages in a step S1304. If it is determined that multiple pages are not edited in the step S1304, the fourth preferred process proceeds to a step S1310. On the other hand, if it is determined that multiple pages are edited in the step S1304, the fourth preferred process proceeds to a step S1305, where the multiple images are displayed and it is further determined whether or not the combined image is confirmed. If the confirmation steps are not performed, the fourth preferred process proceeds to the step S1310. On the other hand, if the confirmation steps are performed, the fourth preferred process proceeds to a step S1306, where the multiple pages of the image are ORed, and the combined image is displayed with the selected area on the display unit 105a. In a step S1307, a user is given an option to modify the currently specified paper size. If the user decides to modify the current paper size, the fourth preferred process provides the user with an opportunity to modify the size and or the position of the paper in a step S1308 and further proceeds to a step S1309. If the user decides not to modify the current paper size, the fourth preferred process bypasses the step S1308 and proceeds to the step S1309. In the step S1309, the user confirms whether or not the currently selected paper size is used to print the image in the combined image 1202. If the user fails to confirm the paper size change in the step S1309, the fourth preferred process terminates. Finally, if the user confirms the paper size change in the step S1309, the fourth preferred process performs the paper size change in the step S1310. The above fourth preferred process of the image processing according to the current invention enables to maintain the amount of the specifying task by the operator regardless of the number of image pages. Furthermore, by displaying the combined overlapped image, the operator is able to visually confirm the paper size. Because of the above described features, the operator is able to easily specify the paper size in an assured manner without significant experience or knowledge of computer programs.

In exemplary implementation, the above described first through fourth preferred embodiments are implemented in software that is stored in computer readable media such as hard disks, floppy disks, CD-ROM, MO and DVD. The above described software is distributed via the network 107. Furthermore, the above described software is not limited to the OR processing of the individual images to generate a combined image. For example, the combined image is generated based upon AND processing, EXOR processing or any other image combining techniques.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of image processing comprising the steps of:
   selecting pages of image to identify selected pages;
   combining the selected pages of the image into a single overlapping image;

displaying the single overlapping image;

selecting a portion of the single overlapping image to specify a selected portion while the single overlapping image is being displayed;

selecting a process to be performed on the selected portion;

simultaneously image processing the selected portion of each of the pages of the image based upon the selected process while the single overlapping image is being displayed to generate image processed pages of the image; and outputting separately each of the image processed pages of the image.

2. The method of image processing according to claim 1 wherein said image processing is to remove the selected portion.

3. The method of image processing according to claim 1 wherein said image processing is to insert data into the selected portion.

4. The method of image processing according to claim 3 wherein the data includes a combination of an image and text.

5. The method of image processing according to claim 1 wherein said image processing is to move the selected portion within the single overlapping image.

6. The method of image processing according to claim 1 wherein the selected portion is an entire portion of the single overlapping image, said image processing step further comprising selecting a paper size to fit the entire portion of the single overlapping image, said outputting step printing each of the image processed pages onto a sheet of the selected paper size.

7. The method of image processing according to claim 1 wherein said outputting step is to print out each of the image processed pages of the image.

8. The method of image processing according to claim 1 wherein said selecting step in selecting the portion further comprises the additional steps of:

displaying a rectangle to indicate the selected portion;

dragging a first portion of the rectangle to change a size of the rectangle; and dragging a second portion of the rectangle to move a position of the rectangle.

9. The method of image processing according to claim 8 wherein an inside area of the rectangle is image processed in said image processing step.

10. The method of image processing according to claim 8 wherein an outside area of the rectangle is image processed in said image processing step.

11. A computer readable medium storing computer instructions for image processing, the computer instructions performing the following tasks:

providing a first interface for selecting pages of image to identify selected pages;

combining the selected pages of the image into a single overlapping image;

displaying the single overlapping image;

providing a second interface for selecting a portion of the single overlapping image to specify a selected portion while the single overlapping image is displayed;

providing a third interface for selecting a process to be performed on the selected portion;

simultaneously image processing the selected portion of each of the pages of the image based upon the selected process while the single overlapping image is being displayed to generate image processed pages of the image; and outputting separately each of the image processed pages of the image.

12. The computer readable medium storing computer instructions according to claim 11 wherein said image processing is to remove the selected portion.

13. The computer readable medium storing computer instructions according to claim 11 wherein said image processing is to insert data into the selected portion.

14. The computer readable medium storing computer instructions according to claim 13 wherein the data includes a combination of an image and text.

15. The computer readable medium storing computer instructions according to claim 11 wherein said image processing is to move the selected portion within the single overlapping image.

16. The computer readable medium storing computer instructions according to claim 11 wherein the selected portion is an entire portion of the single overlapping image, said image processing task further providing a third interface for selecting a paper size to fit the entire portion of the single overlapping image, said outputting task-printing each of the image processed pages onto a sheet of the selected paper size.

17. The computer readable medium storing computer instructions according to claim 11 wherein said outputting step is to print out each of the image processed pages of the image.

18. The computer readable medium storing computer instructions according to claim 11 wherein said selecting task in selecting the portion further comprises the additional tasks of:

displaying a rectangle to indicate the selected portion;

dragging a first portion of the rectangle to change a size of the rectangle; and dragging a second portion of the rectangle to move a position of the rectangle.

19. The computer readable medium storing computer instructions according to claim 18 wherein an inside area of the rectangle is image processed in said image processing task.

20. The computer readable medium storing computer instructions according to claim 18 wherein an outside area of the rectangle is image processed in said image processing task.

21. A system for image processing comprising:

an input unit for selecting pages of image to identify selected pages;

an image combining unit connected to said input unit for combining the selected pages of the image into a single overlapping image;

a display unit connected to said input unit and said image combining unit for displaying the single overlapping image;

a selection unit connected to said display unit for selecting a portion of the single overlapping image to specify a selected portion and a process to be performed on the selected portion while the single overlapping image is being displayed;

an image processing unit connected to said selection unit for simultaneously image processing the selected portion of each of the pages of the image based upon the selected process while the single overlapping image is being displayed, image processed pages of the image being generated, said image processing unit separately outputting each of the image processed pages of the image.

22. The system for image processing according to claim 21 wherein said image processing unit removes the selected portion.

23. The system for image processing according to claim 21 wherein said image processing unit inserts data into the selected portion.

24. The system for image processing according to claim 23 wherein the data includes a combination of an image and text.

25. The system for image processing according to claim 21 wherein said image processing unit moves the selected portion within the single overlapping image.

26. The system for image processing according to claim 21 wherein said selection unit further selects a paper size to fit an entire portion of the single overlapping image and further comprises a printer connected to said image processing unit for printing each of the image processed pages onto a sheet of the selected paper size.

27. The system for image processing according to claim 21 wherein said selection unit displays a rectangle to indicate the selected portion, said selection unit providing a user interface for dragging a first portion of the rectangle to change a size of the rectangle and for dragging a second portion of the rectangle to move a position of the rectangle.

28. The system for image processing according to claim 27 wherein said image processing unit image processes an inside area of the rectangle.

29. The system for image processing according to claim 27 wherein said image processing unit image processes an outside area of the rectangle.

30. An image processing apparatus, comprising:
a page controller for providing a first interface for selecting pages of image to identify selected pages;
a page image generation unit connected to said page controller for combining the selected pages of the image into a single overlapping image;
a display unit connected to said page controller and said page image generation unit for displaying the single overlapping image, said display unit providing a second interface for selecting a portion of the single overlapping image to specify a selected portion while the single overlapping image is being displayed, said display unit providing a third interface for selecting a process to be performed on the selected portion, wherein said page controller simultaneously image processing the selected portion of each of the pages of the image based upon the selected process while the single overlapping image is being displayed on said display unit to generate image processed pages of the image, said page controller outputting separately each of the image processed pages of the image.

31. The image processing apparatus according to claim 30 wherein said page controller removes the selected portion.

32. The image processing apparatus according to claim 30 wherein said page controller inserts data into the selected portion.

33. The image processing apparatus according to claim 32 wherein the data includes a combination of an image and text.

34. The image processing apparatus according to claim 30 wherein said page controller moves the selected portion within the single overlapping image.

35. The image processing apparatus according to claim 30 wherein the selected portion is an entire portion of the single overlapping image, said display unit further providing a third interface for selecting a paper size to fit the entire portion of the single overlapping image, said page controller outputting to a printer for printing each of the image processed pages onto a sheet of the selected paper size.

36. The image processing apparatus to claim 30 wherein said page controller outputs to a printer for printing each of the image processed pages of the image.

37. The image processing apparatus according to claim 30 wherein said second interface displays a rectangle to indicate the selected portion, a first portion of the rectangle being dragged to change a size of the rectangle, a second portion of the rectangle being dragged to move a position of the rectangle.

38. The image processing apparatus according to claim 37 wherein said page controller processes an inside area of the rectangle.

39. The image processing apparatus according to claim 37 wherein said page controller processes an outside area of the rectangle.

40. An image processing device, comprising:
an input unit for selecting pages of image to identify selected pages;
an image combining unit connected to said input unit for combining the selected pages of the image into a single overlapping image;
a display unit connected to said input and said image combining unit for displaying the single overlapping image;
a selection unit connected to said display unit for selecting a portion of the single overlapping image to specify a selected portion and a process to be performed on the selected portion while the single overlapping image is being displayed;
an image processing unit connected to said selection unit for simultaneously image processing the selected portion of each of the pages of the image based upon the selected process while the single overlapping image is being displayed, image processed pages of the image being generated, said image processing unit separately outputting each of the image processed pages of the image.

41. The image processing device according to claim 40 wherein said image processing unit removes the selected portion.

42. The image processing device according to claim 40 wherein said image processing unit inserts data into the selected portion.

43. The image processing device according to claim 42 wherein the data includes a combination of an image and text.

44. The image processing device according to claim 40 wherein said image processing unit moves the selected portion within the single overlapping image.

45. The image processing device according to claim 40 wherein said selection unit further selects a paper size to fit an entire portion of the single overlapping image and further comprises a printer connected to said image processing unit for printing each of the image processed pages onto a sheet of the selected paper size.

46. The image processing device according to claim 40 wherein said selection unit displays a rectangle to indicate the selected portion, said selection unit providing a user interface for dragging a first portion of the rectangle to change a size of the rectangle and for dragging a second portion of the rectangle to move a position of the rectangle.

47. The image processing device according to claim 46 wherein said image processing unit image processes an inside area of the rectangle.

48. The image processing according to claim 46 wherein said image processing unit image processes an outside area of the rectangle.

* * * * *